United States Patent
Slater

[11] Patent Number: 5,974,211
[45] Date of Patent: Oct. 26, 1999

[54] ENHANCED COLLECTION EFFICIENCY FIBER-OPTIC PROBE

[75] Inventor: Joseph B. Slater, Dexter, Mich.

[73] Assignee: Kaiser Optical Systems, Ann Arbor, Mich.

[21] Appl. No.: 09/019,774

[22] Filed: Feb. 6, 1998

Related U.S. Application Data

[60] Provisional application No. 60/037,691, Feb. 7, 1997.

[51] Int. Cl.⁶ ........................................................ G02B 6/32
[52] U.S. Cl. .................. 385/33; 385/42; 385/37; 385/115; 385/119
[58] Field of Search ................................. 385/33, 31, 32, 385/37, 38, 42, 43, 115, 116, 119, 120

[56] References Cited

U.S. PATENT DOCUMENTS

| | | | |
|---|---|---|---|
| 4,573,761 | 3/1986 | McLachlan et al. | 385/33 X |
| 5,402,508 | 3/1995 | O'Rourke et al. | 385/31 |

OTHER PUBLICATIONS

B. Marquardt, S. Goode, S. Angel, In Situ Determination of Lead in Paint Laser–Induced Breakdown Spectroscopy Using a Fiber–Optic Probe, *Anal. Chem.* 1996, 68, pp. 977–981.

*Primary Examiner*—Phan T. H. Palmer
*Attorney, Agent, or Firm*—Gifford, Krass, Groh, Sprinkle, Andeson & Citowski, PC

[57] ABSTRACT

A fiber-optic probe uses imaging optics between the remote ends of the excitation and collection fibers and the sample under investigation to enhance working distance and efficiency. In one embodiment a plurality of collection fibers are disposed circumferentially around a central excitation fiber, enabling a conventional focussing lens arrangement to be used for imaging purposes. The assembly may optionally include a rotationally symmetric diffraction grating to cause the excitation energy to assume an annulus superimposed over the image of the collection fibers. The excitation and collection fiber may alternatively be physically spaced apart from one another sufficient to permit one or more optical elements to be disposed in either or both of the excitation and collection paths, depending upon the application.

12 Claims, 2 Drawing Sheets

ENHANCED COLLECTION EFFICIENCY FIBER-OPTIC PROBE

REFERENCE TO RELATED APPLICATION

This application claims priority of U.S. provisional application Ser. No. 60/037,691, filed Feb. 7, 1997, the entire contents of which are incorporated herein by reference.

FIELD OF THE INVENTION

The present invention relates generally to remote optical measurement probes of the type wherein optical fibers are used to stimulate and collect optical spectra for Raman, fluorescence or other forms of detection and, in particular, to such a probe wherein one or more optical elements are used between the remote ends of the fibers and the sample under investigation to enhance collection efficiency.

BACKGROUND OF THE INVENTION

Fiber-optic probes make it possible to collect optical information such as Raman spectra without having to place the material being characterized inside a spectrometer housing. Such probes therefore simplify the interfacing of spectroscopic systems to chemical processes, and allow analytical instruments to be located remotely from environments in need of spectroscopic monitoring.

The first remote fiber optic probes for Raman spectroscopy were reported by the McCreery group in the early 1980's. Their design used a single optical fiber to deliver laser light to the sample and a single optical fiber to collect light scattered by the sample. More specifically, divergent laser light from the laser delivery fiber was used to illuminate the sample, and light scattered from the sample within the acceptance cone of the collection fiber was transmitted back to the spectrograph. The efficiency of exciting and collecting Raman photons from any individual point in the sample was poor, but the integrated Raman intensity over the unusually large analysis volume compared favorably with the more traditional imaged illumination and collection configurations.

McCreery's dual-fiber Raman probe offered important benefits for remote and routine spectroscopy: 1) the sample could be distant from the Raman instrument, 2) no sample alignment was necessary once the probe was aligned to the spectrograph, 3) the probe could be less 1 mm in diameter, making Raman measurements possible for samples with limited accessibility, 4) the probe could be placed directly in hostile samples (corrosive, hot, etc.) since only silica and the encapsulation material were exposed, and 5) multiple measurements could be made simultaneously by placing multiple collection fibers along the slit height of the spectrograph.

Several improvements to the McCreery Raman probe have more recently been reported. Instead of using just one collection fiber, multiple fibers have been used to increase the collection efficiency, as shown in FIG. 1A. For example, 6 fibers, each having the same diameter as the excitation fiber, may be grouped around the excitation fiber to form a single circular layer, as shown in U.S. Pat. No. 4,573,761. Eighteen fibers, each having the same diameter as the excitation fiber, may also be grouped around the excitation fiber as two circular layers, and so on, though successive layers tend to be less effective at collecting Raman photons than the first layer.

The performance of the McCreery type probe can also be modified for improved collection efficiency and/or working distance by changing the overlap between the emission cone of the excitation fiber and the collection cones of the collection fibers. An early realization of this idea, as disclosed in U.S. Pat. No. 4,573,761, angled the collection fibers such that their optic axes intersected the optic axis of the illumination fiber, as shown in FIG. 1B. This increased the overlap of the excitation and collection cones close to the tip of the fiber probe, where the excitation and collection of Raman photons was most efficient.

The same concept was later implemented in a different way by O'Rourke and Livingston, who ground the tip of the probe into a cone shape, as discussed in U.S. Pat. No. 5,402,508, and illustrated in FIG. 1C. This shape was equivalent to putting prisms (or more correctly, axicon sections) on the collection fibers so that the optic axes of the collection cones crossed the optic axis of the excitation fiber.

One further variation of the McCreery probe design is to use collection fibers having a different diameter than the excitation fiber. This additional variable is useful for changing the working distance of the probe and the fiber coupling to the spectrograph.

One disadvantage of the various arrangements described thus far is that the sample must be very close to the probe tip to realize any significant collection efficiency.

SUMMARY OF THE INVENTION

This invention enhances the flexibility and efficiency of fiber-optic probes through the use of imaging optics and other elements positioned between the remote ends of the fibers and the sample under investigation. Such a configuration not only increases the working distance between the fibers and the sample, but also functions to increase the level of overlap between the excitation and collection paths on or (in the case of a transparent sample) within the sample.

In the preferred embodiment, a plurality of collection fibers is disposed circumferentially around a central excitation fiber, enabling a conventional focussing lens arrangement to be used for imaging purposes. The assembly may optionally include a rotationally symmetric diffraction grating disposed between the distal end of the excitation fiber and the lens element(s), causing the excitation energy to assume the shape of an annulus superimposed over the circular image of the collection fibers.

In an alternative embodiment, the excitation and collection fibers are physically spaced apart from one another, facilitating the use of one or more optical elements in either or both of the excitation and collection paths to enhance overall performance. For example, one or more beam-redirecting elements may be used relative to the excitation or collection paths, or both, to further enhance the overlap therebetween. Filtering elements may also be disposed in either or both of the excitation and collection paths to pass or reject the excitation radiation, respectively.

A method of obtaining emission spectra according to the invention includes the steps of directing excitation radiation onto a sample through an excitation optical fiber having a remote end, collecting optical spectra emitted by the sample through a collection fiber having a remote end, and imaging the remote ends of the excitation and collection fibers into a region of overlap on or in the sample. The disclosed apparatus and method may be applied to various fields of stimulated emission, including Raman and fluorescence detection.

DETAILED DESCRIPTION OF THE INVENTION

Figure 1A:
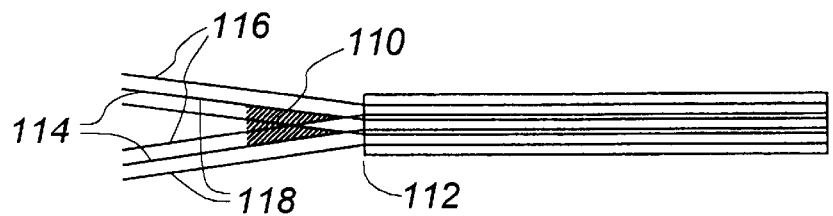
FIG. 1A is a drawing of prior-art fiber-optic probe using a single excitation fiber in the plurality of collection fibers.

This invention enhances the flexibility and efficiency of remote measurement probes of the type wherein one or more optical fibers are used to excite a sample and one or more optical fibers are used to collect characteristic spectra therefrom. Accordingly, the invention finds use in various fields of stimulated emission, including Raman and fluorescence detection. Typically in such arrangements the excitation fiber includes a proximal end to receive excitation radiation form a source such as a laser and a distal end to deliver the energy to the sample. The collection fiber(s) each include a distal end to gather the spectra emitted by the sample and a proximal end feeding appropriate analytical instrumentation.

Broadly, the invention solves problems associated with existing fiber-optic remote measurement probes by imaging points on, or within, a sample onto the distal end of the probe. Such an arrangement offers several advantages relative to the prior-art design depicted in FIG. 1A. First, whereas the overlap region 110 of the excitation and collection paths in the existing design is necessarily very close to the distal tip 112 of the associated fibers, the use of an optical element 202 affords a significantly greater working distance; for example, from distal end 200 to points 204 within sample 206, as shown in FIG. 2A.

The working distance may be varied through the optical arrangement, thereby providing significant flexibility in terms of physical construction. With the sampling region displaced from the distal end of the probe, the optical elements may sealed in an environment which does not make contact with the sample, thereby protecting probe components from contamination. An additional benefit is that elements used to optically modify (e.g., filters) and/or switch (e.g., shutters) can be inserted between the distal tip of the probe and the sample for enhanced system flexibility.

Figure 2B:
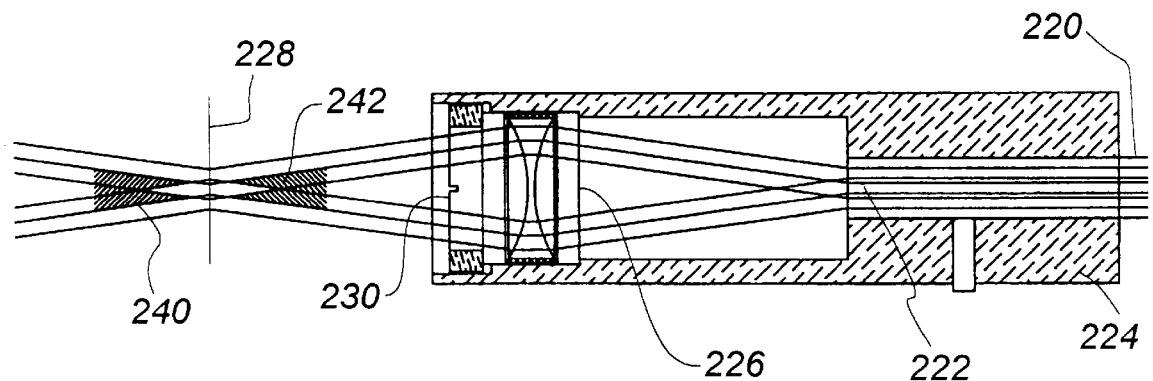
FIG. 2B is a drawing in partial cross-section of a physical implementation of the arrangement introduced with respect to FIG. 2A.
Figure 2A:
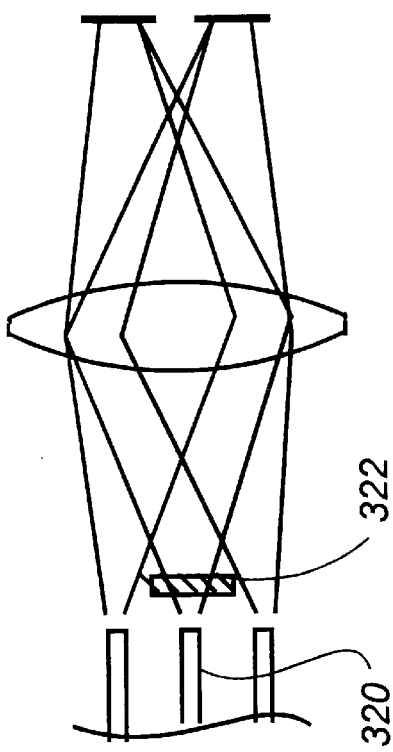
FIG. 2A is a simplified drawing used to illustrate how an optical element may be disposed between the distal tips of the fibers and a sample under investigation to enhance collection efficiency.

The invention not only allows for adjustments in terms of working distance, but enhances efficiency by multiplying the overlap of the excitation and collection paths, as better understood with reference to FIG. 2B, which illustrates a physical implementation of the design of FIG. 2A. In this case, a bundle of fibers 220 having an excitation fiber 222 disposed centrally therein is held in a fixture 224 having a distal end including a lens assembly 226, which images the ends of the fibers at a focal plane 228. Although lens assembly 226 shows a pair of opposed plano-convex lenses, other arrangements may be used depending upon the type of imaging desired. A protective transparent window 230 may be used to seal off the lens assembly 226 from the external measurement environment.

Figure 1B:
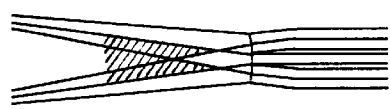
FIG. 1B illustrates how the configuration of FIG. 1A may be improved by orienting the collection fibers to view a greater percentage of the excitation region.
Figure 1C:
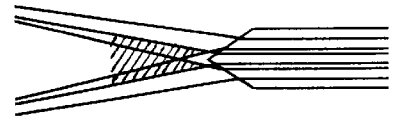
FIG. 1C is a drawing which shows how the distal tips of the excitation and collection fibers may be modified to enhance the overlap between excitation and collection.

Note in FIG. 2B that by virtue of the invention, two overlap regions 240 and 242 are created on either side of a focal plane 228, thereby multiplying the amount of overlap of the excitation and collection beams, thereby enhancing efficiency. Such an arrangement is in contrast to the non-imaged version of a typical fiber-probe, as shown in FIGS. 1A–1C. Using FIG. 1A as an example, since the cone 114 associated with the excitation fiber and the cones 116 and 118 of the collection fibers are all divergent with respect to the distal tip 112 of the probe, the single region of overlap 110 is inconveniently close to the tip 112.

Figure 3:
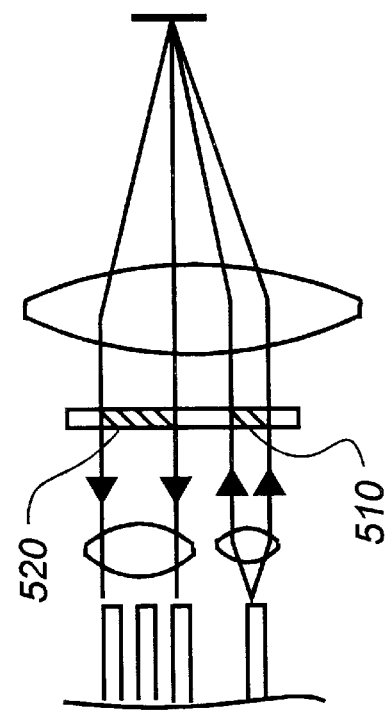
FIG. 3 is a drawing of an alternative embodiment of the invention wherein the use of an optical grating is used in conjunction with an imaging element to further enhance the overlap of excitation and collection regions.

An alternative implementation of the invention is depicted in FIG. 3. Light from the excitation fiber 320 is redirected by a radial (i.e., rotationally symmetric) diffraction grating 322, causing the light to be imaged by the lens into an annular distribution that is superimposed over an annular region containing the set of images of the collection fibers. Note that a conventional axicon could also be used in place of the radial diffraction grating. The redirected light is then brought to a focus superimposed over the image of the collection fibers. In the preferred arrangement grating 322 is supported sufficiently close to the end of the excitation fiber to fill the excitation cone without also overlapping the collection cones of the collection fibers.

Figure 4:
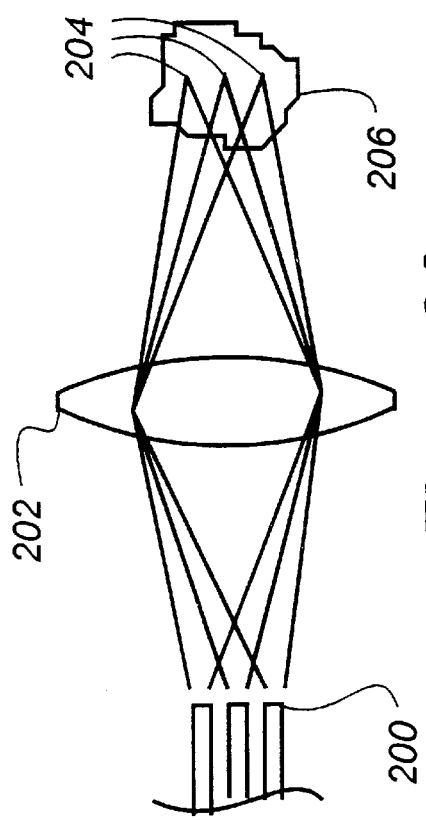
FIG. 4 also uses a grating, but in this case, the contrast to that of FIG. 3, the excitation fiber is laterally separate from a plurality of close-packed collection fibers.

Yet a further alternative arrangement is depicted in FIG. 4, wherein the excitation fiber is physically separate from the collection bundle. This makes the task of modifying the direction of excitation light easier in some cases, allowing the use of more standard gratings, lenses, prisms, and so forth to overlap the excitation and collection regions on the sample. Additional flexibility may be gained by placing collimating lenses in front of the collection excitation fibers as well.

Figure 5:
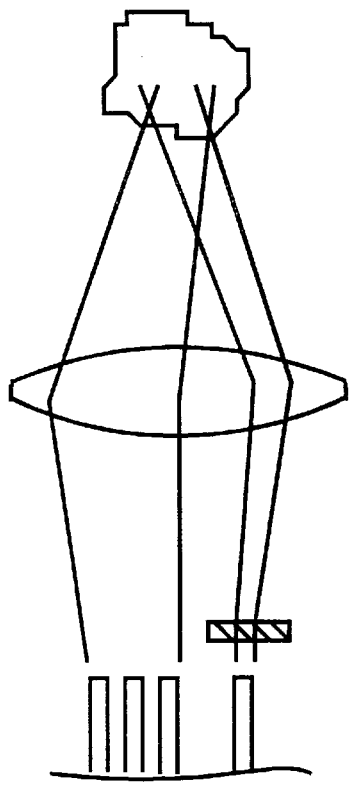
FIG. 5 illustrates yet a further embodiment of the invention utilizing a bandpass and/or a notch filter to enhance the delivery and filtering of the excitation wavelength.

As shown in FIG. 5, filters such as bandpass filter 510 and notch filter 520 may be inserted into the excitation path. The function of the notch filter is to reject Rayleigh scattering (non-wavelength-shifted light). If gratings are used for redirection purposes, they may double in function as bandpass elements, thus removing silica Raman contamination. As an alternative to discrete filter elements, the excitation and/or collection fibers may themselves be modified to perform internal filtering functions, as taught in U.S. application Ser. No. 08/803,012, now U.S. Pat. No. 5,862,273 the entire contents of which are incorporated herein by reference.

I claim:

1. A remote optical measurement probe, comprising:
    an excitation optical fiber having a proximal end for receiving excitation radiation from a source and a distal end for delivering the excitation radiation to a sample;
    a collection fiber having a distal end for receiving spectra emitted by the sample and a proximal end for delivering the sample spectra to analytical apparatus; and
    an optical element supported between the distal ends of the fibers and the sample for imaging the distal ends of both fibers into a region of overlap on or in the sample.

2. The remote optical measurement probe of claim 1, including a plurality of collection fibers.

3. The remote optical measurement probe of claim 2, wherein the collection fibers are disposed circumferentially around a central excitation fiber.

4. The remote optical measurement probe of claim 3, further including a rotationally symmetric diffraction grating disposed between the distal end of the excitation fiber and the optical element, causing the excitation energy to assume an annular ring superimposed over the image of the collection fibers.

5. The remote optical measurement probe of claim 1, wherein the excitation and collection fibers are slightly physically spaced apart from one another.

6. The remote optical measurement probe of claim 5, further including an optical element disposed in the optical path of the excitation radiation for enhancing the overlap of the images of the distal ends of both fibers.

7. The remote optical measurement probe of claim 5, further including a filtering element disposed in the optical path of the excitation radiation.

8. The remote optical measurement probe of claim 5, further including a filtering element disposed in the optical path of the spectra emitted by the sample.

9. The remote optical measurement probe of claim 1, wherein the probe forms part of a Raman detection system.

10. The remote optical measurement probe of claim 1, wherein the probe forms part of a fluorescence detection system.

11. A method of obtaining emission spectra, comprising the steps of:

directing excitation radiation onto a sample through an excitation optical fiber having a remote end;

collecting optical spectra emitted by the sample through a collection fiber having a remote end; and imaging the remote ends of the excitation and collection fibers into a region of overlap on or in the sample.

12. The method of claim 11, further including the step of redirecting the excitation radiation so as to increase the amount of overlap.

* * * * *